May 15, 1962 — R. H. BAUMAN — 3,034,602
AUTOMATIC BRAKE ADJUSTER
Filed July 21, 1960

INVENTOR
Robert H. Bauman
BY
Arthur R. Nelson
HIS ATTORNEY

United States Patent Office 3,034,602
Patented May 15, 1962

3,034,602
AUTOMATIC BRAKE ADJUSTER
Robert H. Bauman, Dayton, Ohio, assignor to General Motors Corporation, Detroit, Mich., a corporation of Delaware
Filed July 21, 1960, Ser. No. 44,370
7 Claims. (Cl. 188—79.5)

This invention relates to a vehicle drum brake and more particularly to an automatic brake adjuster for operating in combination with a vehicle drum brake.

The conventional vehicle drum brake requires manual adjustment to maintain the proper operation clearances between the brake shoes and the brake drum, which is accomplished by a serviceman. It is advantageous to provide an adjuster which may be installed on a conventional vehicle brake with the minimum of alteration. Accordingly, this invention is proposed to provide these advantages.

It is an object of this invention to provide a brake adjuster which operates automatically during the braking cycle of a vehicle drum brake.

It is another object of this invention to provide a brake adjuster which operates during the reverse braking cycle of the vehicle drum brake.

It is a further object of this invention to provide a brake adjuster requiring the minimum number of parts and yet insuring positive operation of the adjuster when necessary.

It is a further object of this invention to provide a safety means built into the brake adjuster to prevent over-adjustment of the vehicle brakes.

The objects of this invention are accomplished by providing a pivoting arm pivotally mounted on one of the brake shoes. A resilient member connects the pivoting arm to the anchor pin which provides actuating force for pivoting the arm. The pivoting arm pivots against a compression spring disposed between the pivoting arm and the brake shoe. The pivoting arm also extends to a position adjacent to the ratchet wheel of the adjustable strut to provide rotation of the adjusting screw through the ratchet wheel when said vehicle brakes are operated in the reverse brake operating cycle. The device provides a simple means of providing a brake adjustment which is operated on the reverse braking cycle and has built-in safety feature of preventing distortion of the pivoting arm.

Further objects and advantages of the present invention will be apparent from the following description, reference being had to the accompanying drawings wherein preferred embodiments of the present invention are clearly shown.

Figure 1:
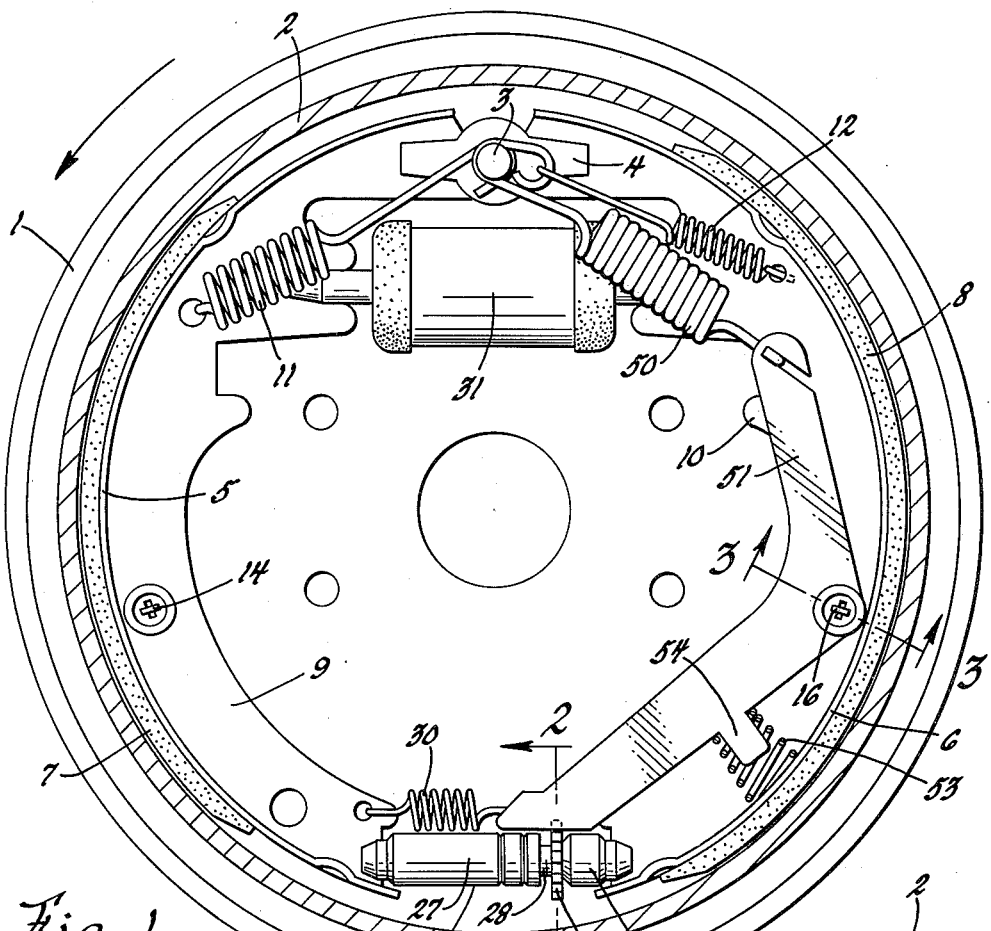
FIGURE 1 is a cross-sectioned view of a brake drum which illustrates the related parts of the braking structure in combination with the brake adjuster.
Figure 2:
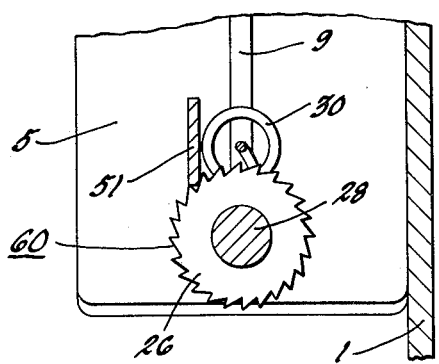
FIGURE 2 is a cross-sectioned view taken on line 2—2 of FIGURE 1.
Figure 3:
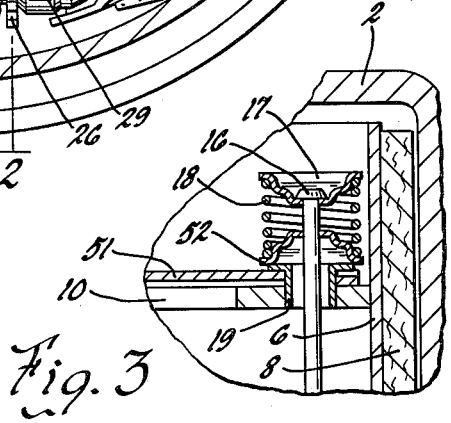
FIGURE 3 is a cross-sectioned view on line 3—3 of FIGURE 1.

FIGURE 1 shows a vehicle drum brake with a brake adjuster located within the braking structure. The backing plate 1 is mounted adjacent to the drum 2. An anchor pin 3 is connected to the backing plate 1. A washer 4 is mounted on the anchor pin 3 adjacent the shoe webbing of the primary shoe 5 and the secondary shoe 6. The brake shoe 6 carries frictional material 8 and the brake shoe 5 carries a frictional material 7 for engaging the brake drum. The shoe webbing 9 of the shoe 5 and the shoe webbing 10 of the shoe 6 engage the anchor pin 3 on their two cooperative adjacent ends when the brake shoes are in their retracted position. The return spring 11 is connected to the primary shoe webbing 9 and the anchor pin 3. The return spring 12 is connected between the secondary shoe webbing 10 and the spring 50 which is provided with a return bend to engage the retraction spring. The shoe webbing 9 is held in its relative position to the backing plate 1 by the pin assembly 14. The pin 16 and its assembly are used to provide a pivoting mount for the pivoting arm 51 and to hold the shoe webbing 10 in its relative position to the backing plate. The pin 16 is shown in detail in FIGURE 3 wherein the pin 16 extends from the backing plate through the brake shoe webbing and the pivoting arm 51, and engages a cup-shaped member 17 on its upper end. The sleeve 19 extends through the pivoting arm 51 and the secondary brake shoe 10 and provides for pivoting means for the lever 51 in relation to the secondary shoe webbing 10. The spring 18 is compressibly mounted between the cup member 17 and the spring retainer 52 to maintain a position of the brake shoe webbing 10.

The opposite two cooperative adjacent ends of the brake shoes 5 and 6 engage the ends of the adjustable strut 60. The adjustable strut 60 includes a sleeve 27 having a threaded inner periphery and engages the brake shoe webbing 9. The sleeve 29 has a hollow smooth inner periphery and engages the brake shoe webbing 10 of shoe 6. An adjustable screw 28 threadedly engages the sleeve 27 and has a shank portion which is received within the sleeve 29. The adjusting screw 28 has a ratchet wheel portion 26 to provide rotation of the adjusting screw when the vehicle brakes are adjusted. The permanent contacting position of the brake shoe webbing 9 and 10 is provided through the spring 30 which engages the opposite cooperative adjacent ends of the brake shoes.

The wheel cylinder 31 is positioned between two cooperative adjacent ends of the brake shoes located near the anchor pin 3. The wheel cylinder provides the operating means of the vehicle drum brake.

The brake adjuster includes the spring 50 positioned between the pivoting arm 51 and the anchor arm 3. The spring 50 prevents an excessive force being transmitted through the linkage to the ratchet wheel 26. The spring 50 being a resilient member, absorbs a portion of the excessive force before it is transmitted to the system.

The spring 50 is connected to the pivoting arm 51. The pivoting arm 51 is pivotally mounted on the brake shoe webbing 10 of the brake shoe 6. A sleeve 19 is received within the perforation in arm 51 and the webbing 10. A spring retainer 52 provides a seat for the spring. The spring 18 is compressibly held between the spring retainer 52 and the cup-shaped member 17.

The opposite end of the arm 51 forms a pawl for engaging the ratchet wheel 26. The arm 51 operates against the biasing force of spring 53 which is compressibly mounted between the arm 51 and the brake shoe 6.

The spring 53 seats on the tab 54 of the arm 51 which maintains a spring 53 in its position within the braking structure. The arm 51 is resiliently positioned by the spring 53, which causes the arm 51 to rotate about sleeve 19 to a point restricted by spring 50. The spring 50 has sufficient initial tension wound into it to operate the arm 51 in adjusting the vehicle brakes, as the arm 51 engages the ratchet wheel 26.

The adjuster operates on reverse rotation of the vehicle drum relative to the forward rotation as indicated by the arrow. As the vehicle brakes are operated, the wheel cylinder 31 extends the brake shoes for frictionally engaging the inner periphery of the drum 2. The frictional engagement of the brake shoes about the inner periphery of the drum 2 causes a slight rotation of the brake shoes in the direction of the reverse rotation of the brake drum. The rotation in a brake drum causes a shifting movement of the brake shoes and the brake shoe webbing 10 which carries the pivoting arm 51. As the arm 51 shifts circumferentially within the drum, the spring 50 creates a force on the upper end of the arm 51. The force transmitted to the arm 51 causes a counterclockwise rotation as viewed in FIGURE 1. A counterclockwise rotation of the arm 51 causes the lower end of the arm 51 to rotate the ratchet wheel 26. When a sufficient degree of clearance is present between the brake shoes and the brake drum in its retracted position, the movement of the brake shoe webbing 10 is sufficient to cause rotation of the arm 51 for the adjustment of the adjustable strut by the ratchet wheel 26.

As the brakes are released, the retraction springs 11 and 12 return the cooperative adjacent ends of the brake shoes to again contact the anchor pin 3. In the contacting position, the arm 51 is again permitted to rotate clockwise to its normally retracted position as shown in FIGURE 1. The return position of the arm 51 to this position is determined by the resilient action of the spring 53 and the restriction of spring 53.

In the event sufficient adjustment is present in the brake during the braking cycle, the force transmitted by the spring 50 is not great enough to rotate the ratchet wheel 26. This is due to the fact that clearance between the brake shoes and the brake drum is not sufficient to warrant an adjustment. An increased force is caused on the ends of the adjustable strut causing a greater friction to prevent rotation of the ratchet wheel and the adjustment screw for further adjustment of the vehicle brakes.

It can be seen that the disclosure of the brake adjuster provides a device which will not transmit force through the linkage system in the event sufficient adjustment is present within the vehicle drum brake. The force is expended in the extension of the spring 50. The spring 50 is preloaded to provide a transmission of a sufficient force to adjust the brakes when needed. In this manner, the brake adjuster provides a simple manner in providing the brake adjustment and yet retains the feature of preventing overadjustment, or distortion of arm 51 when the brakes are sufficiently adjusted.

While the embodiments of the present invention as herein disclosed constitute preferred forms, it is to be understood that other forms might be adopted.

What is claimed is as follows:

1. In a vehicle drum brake, the combination of, a drum, a pair of brake shoes for engaging said drum and having cooperative adjacent ends, a shoe actuating device placed between two of said cooperative adjacent ends of said brake shoes, an extendible strut having ratchet means positioned between the opposite two cooperative adjacent ends of said brake shoes, and an automatic brake adjusting device comprising an arm pivotally mounted on one of said brake shoes, an extendible spring link between one end of said arm and a fixed portion of the brake, the opposite end of said arm extending to a position adjacent the ratchet means of said strut to actuate the same in extension of said strut in adjustment of said vehicle brakes when said vehicle brakes are operated.

2. In a vehicle drum brake comprising, a backing plate with an anchor pin, a drum mounted adjacent to and concentric with said backing plate, two brake shoes for engaging said drum and having cooperative adjacent ends, a hydraulic wheel cylinder operatively placed between two of said cooperative adjacent ends of said brake shoes, an adjustable strut having a ratchet means and positioned between the opposite two cooperative adjacent ends of said brake shoes, an automatic adjusting device including a pivoting arm pivotally mounted on one of said brake shoes, a resilient member connected to the first end of said pivoting lever and said anchor pin for transmitting an operating force through said resilient member to said pivoting arm, the second end of said pivoting arm located adjacent to the ratchet means of said adjustable strut to provide rotation of said ratchet means in adjustment of said vehicle brakes when said vehicle brakes are operated.

3. In a vehicle drum brake having a primary and a secondary shoe each engageable with a fixed anchor at one end, an automatic adjuster for said shoes comprising, an extendible strut positioned between the unanchored two cooperative adjacent ends of said brake shoes and including a rotatable member to extend the strut, an arm pivotally mounted intermediate the ends thereof on one of said brake shoes, an extendible spring connected between one end of said arm and a fixed portion of the brake, said pivoting arm having the opposite end extending to a position adjacent to the rotatable member and engageable therewith to provide rotation of the rotatable member and extension of said strut in adjustment of said vehicle brakes when said vehicle brakes are operated.

4. In a vehicle drum brake comprising, a backing plate, an anchor pin mounted on said backing plate, a brake drum rotatably mounted adjacent to and concentric with said backing plate, two brake shoes positioned within said brake drum for frictionally engaging the inner periphery of said drum, hydraulic means operatively positioned between two cooperative adjacent ends of said brake shoes, an adjustable strut positioned between the opposite two adjacent ends of said brake shoes, a ratchet wheel to provide elongation of said adjustable strut when said ratchet wheel is rotated, an automatic brake adjuster including a pivoting arm pivotally mounted with one of said brake shoes, a resilient means connected between said anchor pin and said pivoting arm, said pivoting arm extending to a position adjacent to said ratchet wheel to engage said ratchet wheel and provide rotation of said ratchet wheel for brake adjustment when said vehicle brakes are operated.

5. In a vehicle drum brake comprising, in combination, a backing plate, an anchor pin mounted on said backing plate, a brake drum rotatably mounted adjacent to and concentric with said backing plate, two brake shoes for frictionally engaging the inner periphery of said brake drum, hydraulic means connected to two cooperative adjacent ends of said brake shoes, an extendible strut positioned between the opposite two cooperative ends of said brake shoes, a ratchet wheel on said strut to provide elongation of said strut upon rotation of said ratchet wheel, an automatic brake adjuster including a pivoting arm pivotally mounted intermediate its ends on the webbing portion of one of said brake shoes, an extendible spring connected to one end of said pivoting arm and said anchor pin, said pivoting arm extending at its opposite end to the point adjacent to said ratchet wheel to provide rotation of said ratchet wheel and adjustment of said vehicle brakes when said vehicle brakes are operated.

6. In a vehicle drum brake comprising, in combination, a backing plate, an anchor pin mounted on said backing plate, a brake drum rotatably mounted adjacent to and concentric with said backing plate, two brake shoes for frictionally engaging the brake drum, hydraulic means connected to two cooperative adjacent ends of said brake shoes for operating said vehicle brakes, an extendible strut including a ratchet wheel positioned between the opposite two cooperative adjacent ends of said brake shoes, a brake adjuster including a pivoting arm pivotally mounted on one of said brake shoes, a spring connected to said anchor pin and one end of said pivoting arm, a second spring positioned between said one brake shoe and the opposite end of said pivoting arm, said pivoting arm having said opposite end extending to a position adjacent to said ratchet wheel to provide a brake adjustment through rotation of said ratchet wheel when said vehicle brakes are operated.

7. A vehicle drum brake, comprising, a backing plate, an anchor pin mounted on said backing plate, a brake drum rotatably mounted adjacent to and concentric with said backing plate, two brake shoes for frictionally engaging said brake drum, a hydraulic means operatively positioned between two cooperative adjacent ends of said brake shoes, an extendible strut including a ratchet wheel positioned between the opposite two cooperative adjacent ends of said brake shoes, an automatic brake adjuster including a pivoting arm pivotally mounted on one of said brake shoes, a spring connected to said anchor pin and one end of said pivoting arm, a second spring compressibly positioned between the opposite end of said pivoting arm and said one brake shoe, said opposite end of said pivoting arm extending to a position engageable with said ratchet wheel to provide rotation of said ratchet wheel, said first mentioned spring providing normally a rigid means to transmit an actuating force for operating said arm and providing resilience of said spring when said adjustable arm is held against pivotal movement.

References Cited in the file of this patent

UNITED STATES PATENTS

| | | |
|---|---|---|
| 2,301,272 | Goepfrich | Nov. 10, 1942 |
| 2,762,463 | Brooks | Sept. 11, 1956 |
| 2,938,610 | Dombeck et al. | May 31, 1960 |